(12) United States Patent  
Miyamoto et al.

(10) Patent No.: US 9,878,488 B2  
(45) Date of Patent: Jan. 30, 2018

(54) VACUUM THERMAL INSULATION MATERIAL

(71) Applicant: Panasonic Intellectual Property Management Co., Ltd., Osaka (JP)

(72) Inventors: Kenta Miyamoto, Shiga (JP); Shinya Kojima, Kyoto (JP); Shuuichi Yakushi, Osaka (JP); Noriyuki Miyaji, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/324,364

(22) PCT Filed: Dec. 22, 2015

(86) PCT No.: PCT/JP2015/006388  
§ 371 (c)(1),  
(2) Date: Jan. 6, 2017

(87) PCT Pub. No.: WO2016/113817  
PCT Pub. Date: Jul. 21, 2016

(65) Prior Publication Data  
US 2017/0203498 A1    Jul. 20, 2017

(30) Foreign Application Priority Data  
Jan. 15, 2015    (JP) ................................ 2015-005821

(51) Int. Cl.  
*F16L 59/065*    (2006.01)  
*B29C 65/02*    (2006.01)  
(Continued)

(52) U.S. Cl.  
CPC .......... *B29C 65/028* (2013.01); *B29C 51/002* (2013.01); *B29C 51/14* (2013.01);  
(Continued)

(58) Field of Classification Search  
CPC ..... Y10T 428/231; F16L 59/065; E04B 1/803  
See application file for complete search history.

(56) References Cited

FOREIGN PATENT DOCUMENTS

DE             10305550 A1    8/2004  
DE    202007009396 U1    10/2007  
(Continued)

OTHER PUBLICATIONS

International Search Report of PCT application No. PCT/JP2015/006388 dated Mar. 8, 2016.

(Continued)

*Primary Examiner* — Alexander Thomas  
(74) *Attorney, Agent, or Firm* — McDermott Will & Emery LLP

(57) ABSTRACT

A vacuum heat insulation material includes outer covering material which has a gas barrier property and a core material that is provided in an inside of outer covering material, the inside of the outer covering material being vacuum sealed, in which a sealed portion that is configured by sealing the peripheral edge of outer covering material, fin that is formed on the peripheral edge of outer covering material, and compressed portion which is formed by a protrusion being compressed, the protrusion is generated when the peripheral edge of outer covering material is folded back toward the core material are provided. Thereby, it is possible to provide a vacuum heat insulation material that is able to suppress reduction of a heat insulation property when a plurality of sheets are disposed lined up.

12 Claims, 10 Drawing Sheets

(51) Int. Cl.
  *B29C 51/14*   (2006.01)
  *B29C 65/00*   (2006.01)
  *B29C 51/00*   (2006.01)
  B29K 23/00    (2006.01)
  B29K 75/00    (2006.01)
  B29K 105/04   (2006.01)
  B29L 9/00     (2006.01)

(52) U.S. Cl.
  CPC ........ *B29C 66/0324* (2013.01); *B29C 66/433* (2013.01); *F16L 59/065* (2013.01); *B29K 2023/0625* (2013.01); *B29K 2075/00* (2013.01); *B29K 2105/04* (2013.01); *B29L 2009/00* (2013.01)

(56) References Cited

FOREIGN PATENT DOCUMENTS

| | | |
|---|---|---|
| JP | 61-027391 | 2/1986 |
| JP | 64-004111 B | 1/1989 |
| JP | 2006-090431 | 4/2006 |
| JP | 2013-083283 | 5/2013 |
| JP | 2013-104490 | 5/2013 |
| KR | 2013-037640 | 4/2013 |
| WO | 2013/122289 | 8/2013 |

OTHER PUBLICATIONS

The Extended European Search Report dated Oct. 6, 2017 for the related European Patent Application No. 15877772.2.

VACUUM THERMAL INSULATION MATERIAL

This application is a U.S. national stage application of the PCT international application No. PCT/JP2015/006388 filed on Dec. 22, 2015, which claims the benefit of foreign priority of Japanese patent application 2015-005821 filed on Jan. 15, 2015, the contents all of which are incorporated herein by reference.

TECHNICAL FIELD

The present invention relates to a vacuum heat insulation material.

BACKGROUND ART

In general, a vacuum heat insulation material is manufactured by inserting a core material into an outer covering material with a bag shape and reducing pressure inside the outer covering material. Fins are formed on the outer periphery of the vacuum heat insulation material, the fins not interposing the core material therebetween and being made from only the outer heat covering material.

Such a vacuum heat insulation material is used by bending the fins described above to the horizontal plane side of the outer covering material and superimposing the fins on the outer covering material (for example, refer to PTL 1 and PTL 2).

FIG. 13 is a diagram illustrating a sectional structure of vacuum heat insulation material 100 of the background art described in PTL 1.

Vacuum heat insulation material 100 has outer covering material 102 in which core material 101 is vacuum sealed. Fin 103 which is provided on a peripheral edge of outer covering material 102 is bent and superimposed on the horizontal plane of outer covering material 102 (horizontal plane of a longitudinal direction (vertical direction) in the drawings). Fin 103 is fixed by being pasted to the horizontal plane using fixing member 104 such as tape, and is incorporated in heat insulation wall 105 of a refrigerator.

In this manner, since fin 103 is used superimposed and fixed on the horizontal plane of outer covering material 102, flow of a foam heat insulation material such as a rigid polyurethane foam is not inhibited by fin 103 (peripheral edge portion). Consequently, it is possible to obtain vacuum heat insulation material 100 with a favorable heat insulation property without generating an air pocket, a void, a urethane unfilled part, and the like.

FIG. 14 is a diagram illustrating a configuration of a bent unit in vacuum heat insulation material 100 in the background art.

Outer covering material 102 of vacuum heat insulation material 100 is formed of a laminated sheet (hereinafter, referred to as an outer covering material sheet) on which a gas barrier layer made from aluminum foil and the like, a thermally fused layer, and a protective layer are laminated, and has flexibility. Then, the bent unit on the side surface of the outer covering material sheet is configured by fin 103 that is formed by overlapping two outer covering material sheets. Therefore, the bent unit has quite high rigidity and strength. Therefore, as shown in FIG. 14, bent part 103a of fin 103 protrudes from side surface 100a of vacuum heat insulation material 100.

Since fin 103 on side surface 100a side and fin 103 on side surface 100b on a side which intersects with fin 103 on side surface 100a side overlap, bent part 103a is large on a corner that is orthogonal to two sides of side surfaces 100a and 100b of vacuum heat insulation material 100. In addition, an amount of protrusion of protrusion 107 is larger than an amount of protrusion of bent part 103a which is formed in a center part other than the corner of side surface 100a, that is, a longitudinal direction part.

In particular, when a case is assumed in which outer covering material 102 is a three-sided bag type that is formed by fusing three sides of the two outer covering material sheets, outer covering material 102 includes at least four or more sheets (two or more fins) of outer covering material sheets of two sheets (one fin) of outer covering material sheets of fin 103 on side surface 100a side and two sheets (one fin) of outer covering material sheets of fin 103 on side surface 100b side in protrusion 107 of bent part 103a. Protrusion 107 of the corner formed in this manner is particularly large in comparison to the amount of protrusion of bent part 103a which is generated in the center part of a side other than the corner.

Presence of such protrusion 107 hardly influences flow of the foam heat insulation material such as a rigid polyurethane foam from the viewpoint of the flow being inhibited due to fin 103 and does not cause substantial reduction in a heat insulation property.

However, recently, the high heat insulation property of the vacuum heat insulation material has gained attention, while the application thereof is also developed in the heat insulation wall of a house, a refrigerated container, and the like. In a case of use in such an application, it is often the case that a thick vacuum heat insulation material is used. Therefore, in a case where a plurality of vacuum heat insulation materials 100 are used disposed lined up, protrusions 107 are in a state of abutting with each other, a gap is generated between each adjacent vacuum heat insulation material 100, and the heat insulation property as the heat insulation wall is impaired. Therefore, it becomes necessary for the gap that is generated between each vacuum heat insulation material 100 to be filled in by a heat insulation material, for example, glass wool and the like.

CITATION LIST

Patent Literature

PTL 1: JP-B-64-4111
PTL 2: WO2013/122289

SUMMARY OF THE INVENTION

The present invention is carried out in consideration of the problems of the background art described above, and is to provide a vacuum heat insulation material that is able to suppress reduction of a heat insulation property when a plurality of sheets are disposed lined up.

According to the present invention, there is provided a vacuum heat insulation material including an outer covering material that has a gas barrier property and a core material that is provided inside the outer covering material of which the inside is vacuum sealed. The vacuum heat insulation material includes a sealed portion that is configured by sealing the peripheral edge of the outer covering material, a fin that is formed on the peripheral edge of the outer covering material, and a compressed portion which is formed by a protrusion being compressed that is generated when the peripheral edge of the outer covering material is folded back toward the core material.

Thereby, the compressed portion is formed by the protrusion being compressed that is generated on the side surface and configured such that the peripheral edge of the outer covering material of the vacuum heat insulation material is bent, and the entire side surface of a side has a substantially equal height across the entire side surface reaching from a corner in a longitudinal direction. Consequently, even if the vacuum heat insulation material is installed with a plurality of sheets lined up, it is possible to prevent a large gap from forming between adjacent vacuum heat insulation materials, and it is possible to suppress reduction of the heat insulation property due to generation of the gap.

According to the present invention, it is possible to provide the vacuum heat insulation material which is able to suppress reduction of the heat insulation property due to a gap between the vacuum heat insulation materials that are generated when the vacuum heat insulation materials are disposed lined up, and secure a high heat insulation property.

DESCRIPTION OF EMBODIMENT

An embodiment of the present invention will be described below with reference to the drawings. Note that, the present invention is not limited to the embodiment.

An embodiment of the present invention will be described below.

Figure 1:
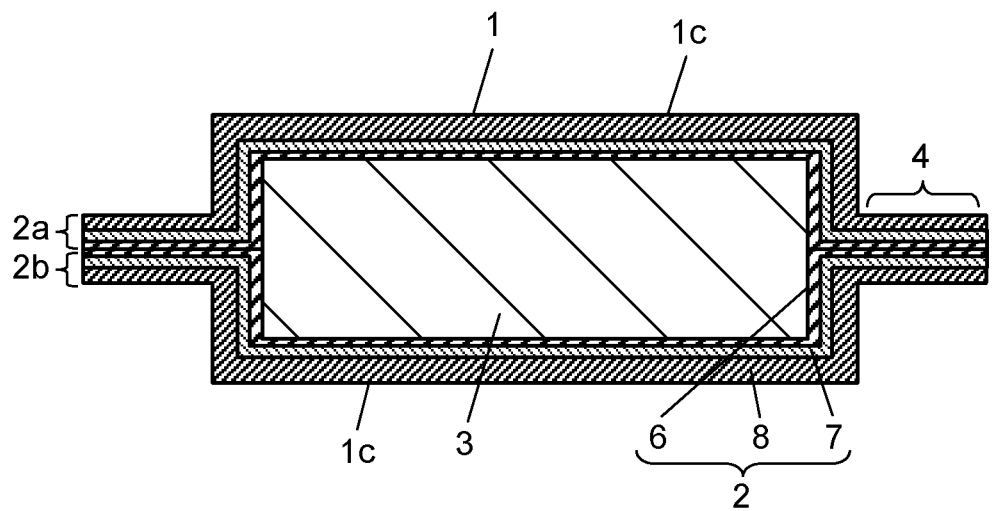
FIG. 1 is a sectional view of a vacuum heat insulation material in an embodiment of the present invention.
Figure 2:
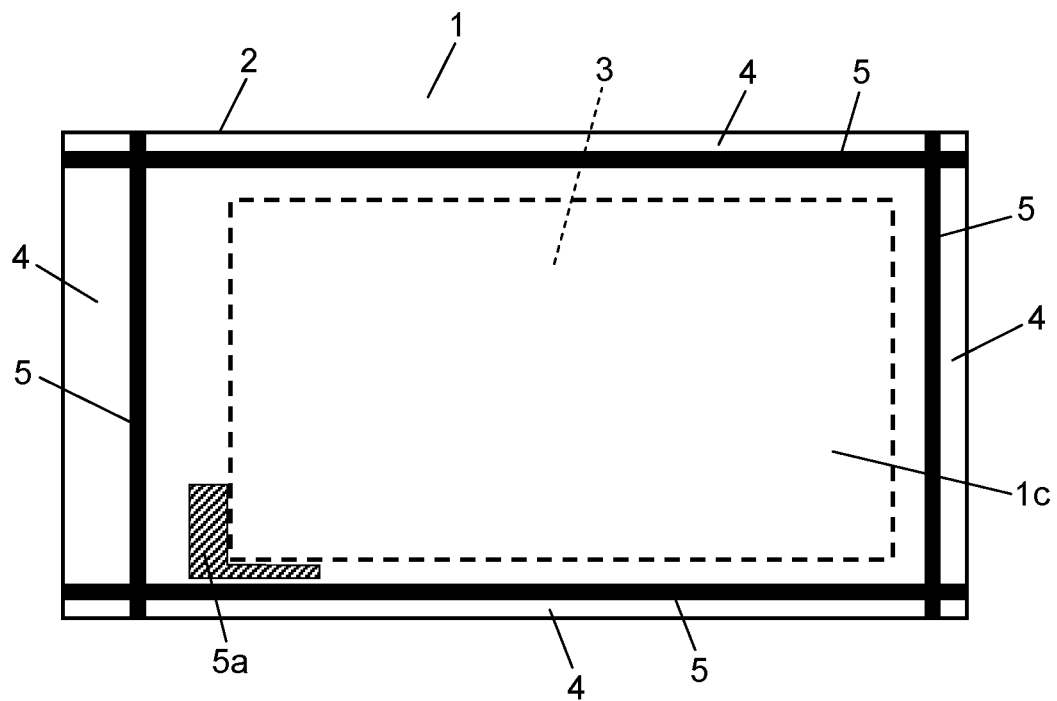
FIG. 2 is a planar view of the vacuum heat insulation material in the embodiment of the present invention.
Figure 3:
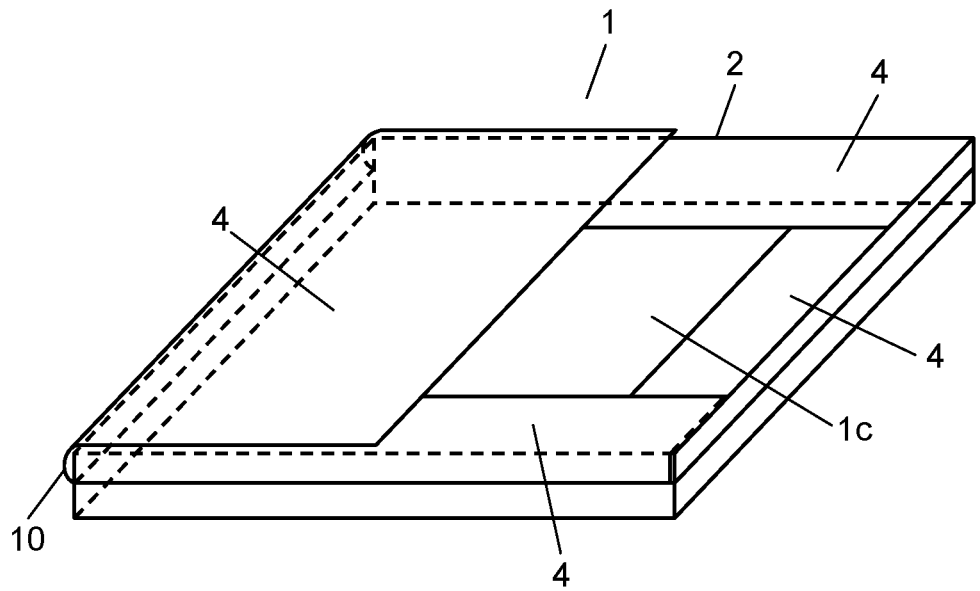
FIG. 3 is a perspective view illustrating a state in which a fin of the vacuum heat insulation material is superimposed on an outer covering material in the embodiment of the present invention.
Figure 4:
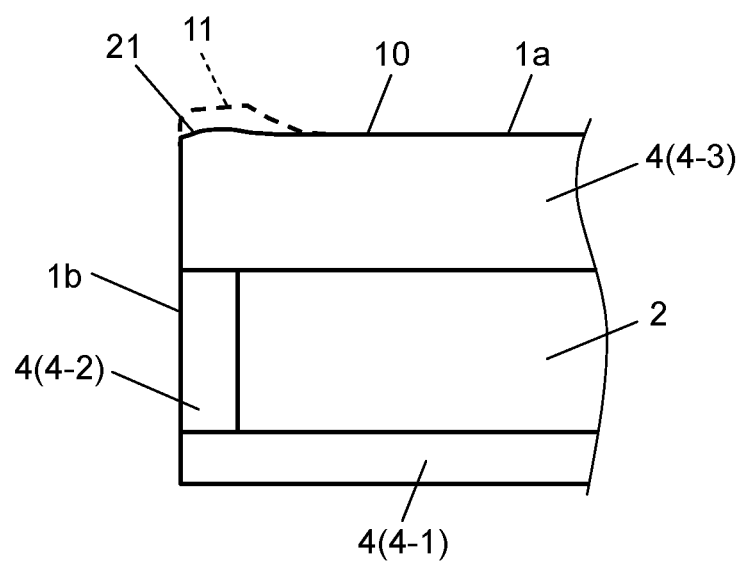
FIG. 4 is an enlarged planar view illustrating a corner of the vacuum heat insulation material in the embodiment of the present invention.
Figure 5:
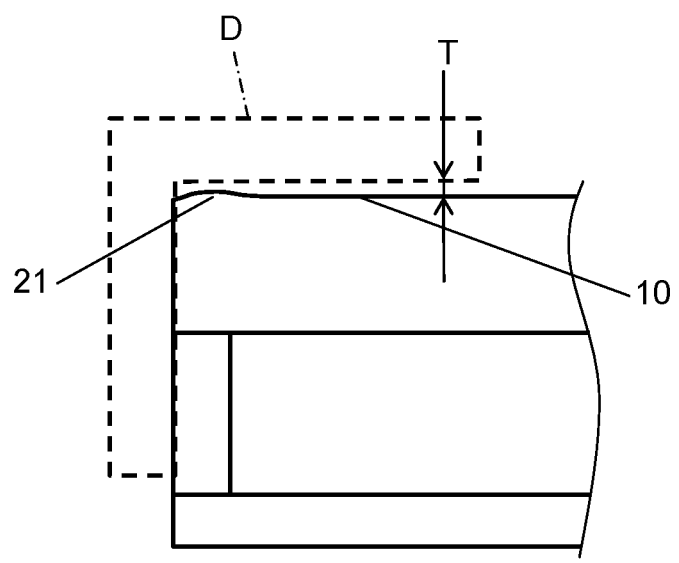
FIG. 5 is a planar view for describing a compressed portion height of the corner side surface of the vacuum heat insulation material and a height measurement in the embodiment of the present invention.

FIG. 1 is a sectional view of vacuum heat insulation material 1 in the embodiment of the present invention, FIG. 2 is a planar view of vacuum heat insulation material 1, and FIG. 3 is a perspective view illustrating a state in which a fin of vacuum heat insulation material 1 is superimposed on an outer covering material. In addition, FIG. 4 is an enlarged planar view illustrating a corner of vacuum heat insulation material 1 in the embodiment of the present invention, and FIG. 5 is a planar view for describing a compressed portion height of the corner side surface of vacuum heat insulation material 1 and a height measurement.

Figure 6A:
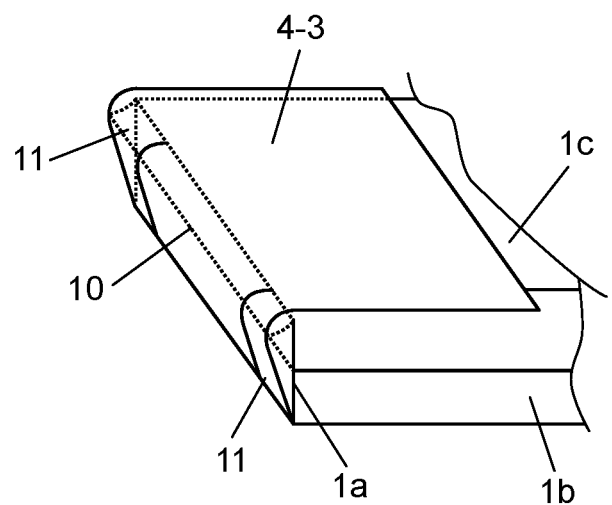
FIG. 6A is a perspective view illustrating a bent state of the fin in the corner of the vacuum heat insulation material in the embodiment of the present invention.
Figure 6B:
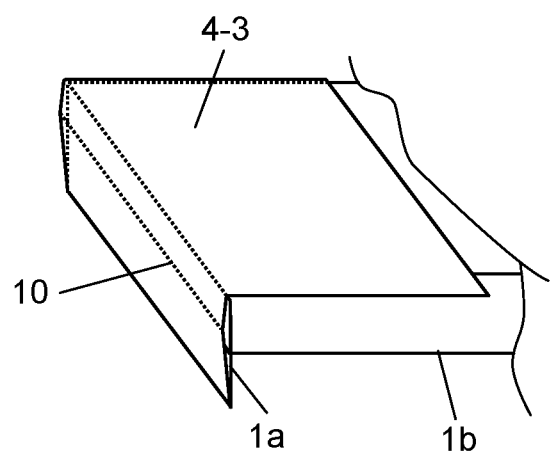
FIG. 6B is a perspective view illustrating a state in which a bent part of the fin is press molded in the corner of the vacuum heat insulation material in the embodiment of the present invention.
Figure 6C:
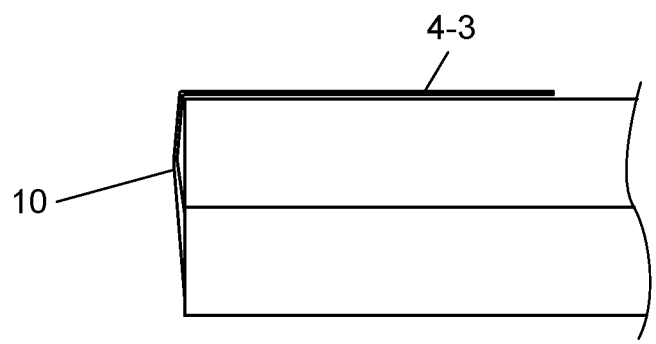
FIG. 6C is a side surface view illustrating a state in which a bent part of the fin is press molded in the corner of the vacuum heat insulation material in the embodiment of the present invention.
Figure 7:
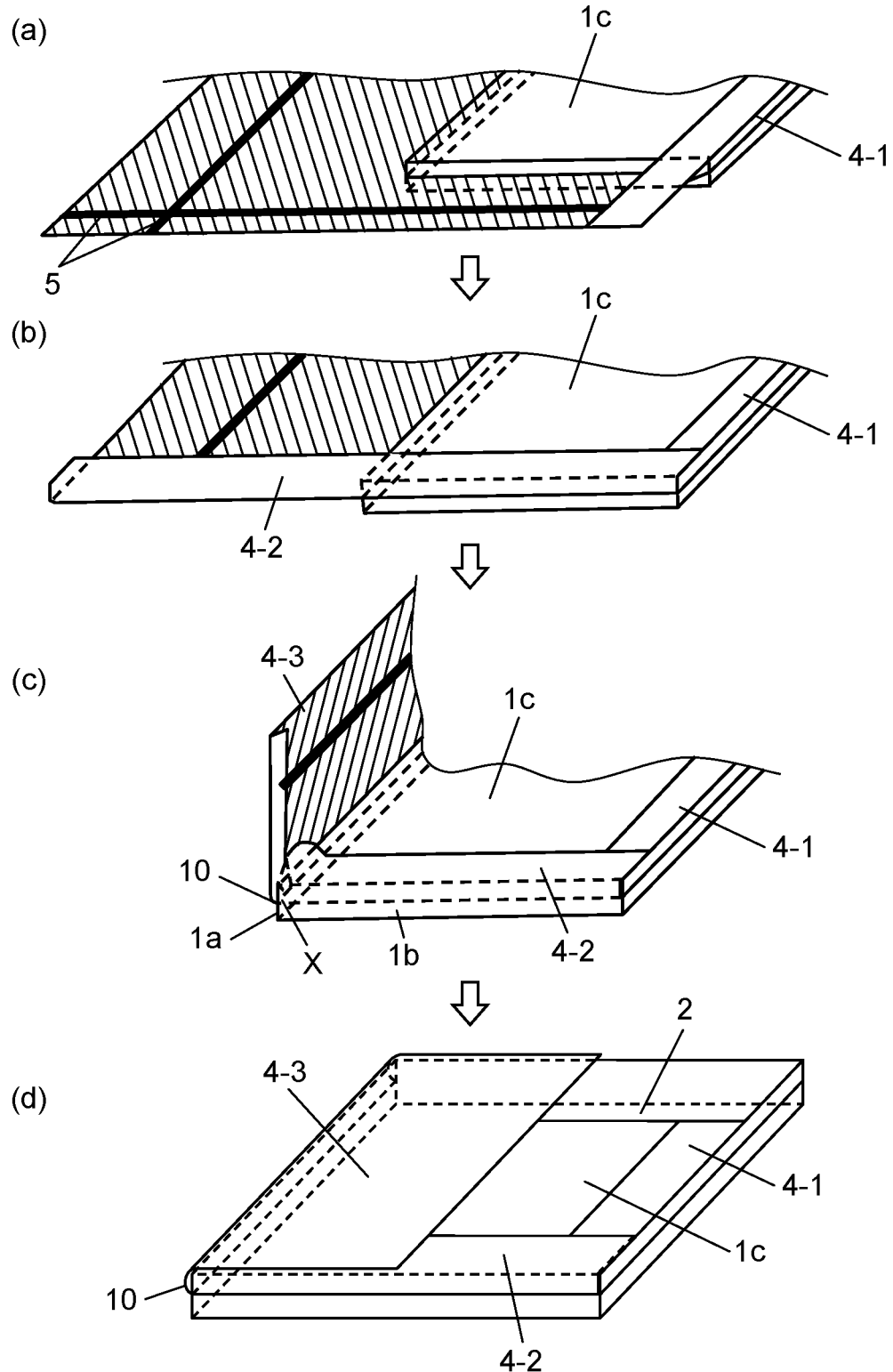
FIG. 7 is a diagram for describing a bending procedure of the fin of the vacuum heat insulation material in the embodiment of the present invention.
Figure 8:
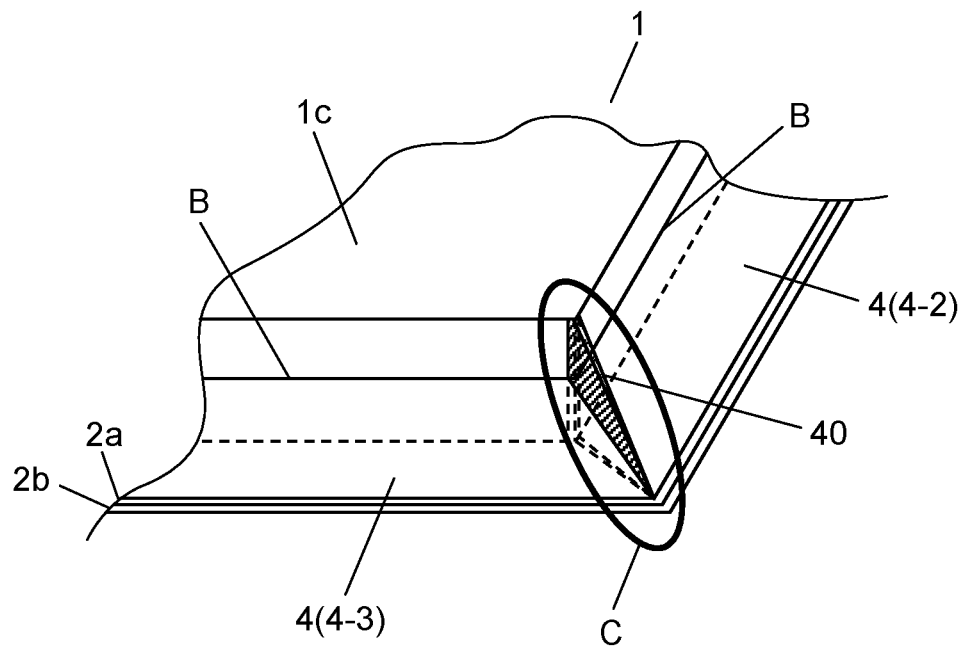
FIG. 8 is a perspective view illustrating a state prior to bending of the corner of the vacuum heat insulation material in the embodiment of the present invention.
Figure 9:
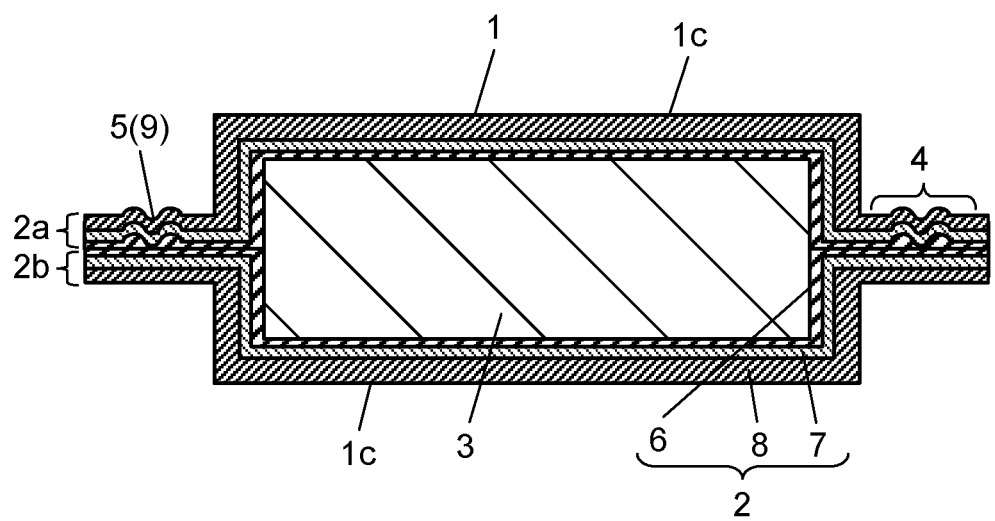
FIG. 9 is a diagram illustrating a sectional configuration of a modification example of the vacuum heat insulation material in the embodiment of the present invention.

In addition, FIG. 6A is a perspective view illustrating a bent state of the fin in the corner of vacuum heat insulation material 1 in the embodiment of the present invention, FIG. 6B is a perspective view illustrating a state in which a bent part of the fin is press molded in the corner of vacuum heat insulation material 1, and FIG. 6C is a side surface view illustrating a state in which a bent part of the fin is press molded in the corner of vacuum heat insulation material 1. Furthermore, FIG. 7 is a diagram for describing a bending procedure of the fin of the vacuum heat insulation material in the embodiment of the present invention, FIG. 8 is a perspective view illustrating a state prior to bending of the corner of vacuum heat insulation material 1, and FIG. 9 is a diagram illustrating a sectional configuration of a modification example of vacuum heat insulation material 1.

As shown in FIGS. 1 and 2, vacuum heat insulation material 1 in the present embodiment is configured by inserting core material 3 that is made from glass wool and the like within outer covering material 2 with a bag shape and reducing pressure inside outer covering material 2. Fins 4 are formed on the outer periphery (peripheral edge) of outer covering material 2, fins 4 not interposing core material 3 therebetween and being made from outer covering material 2 (including thermally fused layer 6).

Manufacture of vacuum heat insulation material 1 is performed as below. First, two outer covering material sheets 2a and 2b with a rectangular shape are superimposed, and outer covering material 2 of a three-sided bag type is formed by sealing the outer periphery portions of three sides with each other using thermally fused seal 5. Then, core material 3 is inserted in the three-sided bag type outer covering material 2, and an opening is sealed by thermally fused seal 5 while vacuuming inside outer covering material 2 with a bag shape using a vacuum packaging machine. By doing this, vacuum heat insulation material 1 is manufactured (refer to FIG. 2). Here, thermally fused seal 5 is an example of a sealed portion.

Outer covering material sheets 2a and 2b of outer covering material 2 normally have an innermost layer, an intermediate layer, and an outermost layer. The innermost layer is made from a thermoplastic resin which is selected from linear low density polyethylene, high, medium and low density polyethylene, polypropylene, polyacrylonitrile, and the like. The intermediate layer is configured by gas barrier layer 7 made from a material that has a barrier property and that is selected from aluminum foil, aluminum vapor deposition film, and the like. Then, the outermost layer is configured by a laminate film in which front surface protective layer 8 having a role of front surface protection is laminated and adhered, and the laminate film is selected from nylon film, polyethylene terephthalate film, and the like.

Note that, in gas barrier layer 7, it is possible to configure respective outer covering material sheets 2a and 2b by combining films of the same type or different types. For example, it is possible to configure gas barrier layer 7 by each combination of aluminum foil film-aluminum foil film, vapor deposition film-vapor deposition film, and aluminum foil film-vapor deposition film.

In addition, vacuum heat insulation material 1 which is indicated by the present embodiment is used in the heat insulation wall of a casing of a housing, container, or the like, and therefore assuming a relatively thick material, for example, the thickness is 30 mm in the present embodiment.

In vacuum heat insulation material 1 that is configured in such a manner, as shown in FIGS. 3 to 7, the peripheral edge of outer covering material 2 (part including fin 4) is bent toward the core material, and is superimposed on one horizontal plane 1c of outer covering material 2 (upper surface in FIG. 3). Here, "superimposed on the horizontal plane of outer covering material" may include a case where fin 4 is directly superimposed to contact horizontal plane 1c of outer covering material 2, and some substance, for example, a separate layer is present on horizontal plane 1c of outer covering material 2 and fin 4 is superimposed to contact the separate layer.

Bending toward the core material of the peripheral edge of outer covering material 2 (part including fin 4) is performed as shown in FIG. 7. First, fin 4-1 of one side of outer covering material 2 that is a three-sided bag is bent from the side surface of vacuum heat insulation material 1 toward horizontal plane 1c, and is superimposed on horizontal plane 1c of a core material equivalent part of outer covering material 2 ((a) of FIG. 7).

Next, fin 4-2 in a direction which intersects (adjacent) with fin 4 is bent from the side surface of vacuum heat insulation material 1 toward horizontal plane 1c and is superimposed on fin 4-1 in the same manner as the method described above ((b) of FIG. 7). Although not illustrated, a fin which faces fin 4-2 is also bent in the same manner and superimposed on fin 4-1.

After that, in the same manner, fin 4-3 on the last one side that is an opening of a three-sided bag is bent from the side surface of the vacuum heat insulation material toward horizontal plane 1c and superimposed on fin 4-2 ((c) of FIG. 7).

At that time, on the side surface to which each fin of vacuum heat insulation material 1 is bent, for example, side surface 1a, as described above, fin 4-3 has quite high rigidity and strength since fin 4-3 is made from two outer covering material sheets 2a and 2b that are superimposed. Consequently, bent unit 10 has a protrusion that protrudes from side surface 1a in a mountain-like shape across the entire region of a side in a longitudinal direction on which fin 4-3 is bent ((d) of FIG. 7).

Furthermore, in particular, in a corner (both ends) of side surface 1a of vacuum heat insulation material 1, bent unit X of fin 4-2 which covers side surface 1b on other side of vacuum heat insulation material 1 is superimposed in a complex manner by being bent along with fin 4-3 of side surface 1a. At this time, the respective fins 4-2 and 4-3 are configured by a polymer sheet of two outer covering material sheets 2a and 2b. Consequently, as indicated by a broken line in FIG. 4, when viewing an upper surface, protrusion 11 which protrudes more greatly than a peak (peak of a ridge) of the entire bent unit 10 that excludes an end on a side along side surface 1a in a longitudinal direction is formed on side surface 1a of the corner.

Protrusion 11 on the corner side surface appears particularly greatly when thickness of vacuum heat insulation material 1 is 20 mm or more as a result of examination performed by an inventor.

That is, as shown in FIG. 8, fin 4 of the peripheral edge of vacuum heat insulation material 1 is formed outside center line B by superimposing outer covering material sheets 2a and 2b approximately on center line B of thickness width of vacuum heat insulation material 1. At this time, ridge 40 is generated in part C which is equivalent to the corner of fin 4.

When fins 4-2 and 4-3 are bent, ridge 40 is folded inside a bent part. However, when the thickness of vacuum heat insulation material 1 is 20 mm or more, ridge 40 is also quite large, and without being folded inside the bent part of fins 4-2 and 4-3, ridge 40 raises and swells the bent part from inside, and as a result, large protrusion 11 is formed.

For example, the vacuum heat insulation material which is indicated in the present embodiment and which is used as the heat insulation wall of a housing, container, or the like is thick of which a thickness is 20 mm or more. Therefore, as described above, since fins 4-2 and 4-3 overlap in a complex manner by two or more, moreover, ridge 40 is folded inside, an amount of protrusion of protrusion 11 of the corner is larger than the peak of bent unit 10 on the longitudinal direction side surface other than the corner. Additionally, as shown in FIG. 9, in a case where thermally fused seal 5 which vacuum seals outer covering material 2 of vacuum heat insulation material 1 is configured to be in a wave shape in concavities and convexities, furthermore, the amount of protrusion becomes large due to the concavities and convexities.

Therefore, in the present embodiment, protrusion 11 that is generated in the corner side surface is squashed (compressed) by press molding the corner side surface of vacuum heat insulation material 1 described above, and as indicated by a solid line in FIG. 4, by forming compressed portion 21, it is possible to set the height thereof approximately equal to the peak of bent unit 10 on the longitudinal direction side surface.

Thereby, the entire side of the part on which fin 4 is bent has substantially equal height across the entire side reaching from the corner in the longitudinal direction. Consequently, in a case where vacuum heat insulation material 1 is used in the housing heat insulation wall, even if vacuum heat insulation material 1 is disposed with a plurality of sheets lined up, it is possible to prevent a large gap from forming between adjacent vacuum heat insulation materials 1, and as a result, it is possible to suppress reduction of the heat insulation property due to generation of the gap.

In particular, in the present embodiment, it is possible to set the height of compressed portion 21 which is formed on corner side surface of vacuum heat insulation material 1 as a height in a range within 5 mm from the peak of bent unit 10 on the longitudinal direction side surface part. As described above, in the present embodiment, "substantially equal height" is a height with a difference within 5 mm.

Here, "substantially equal height" described above is further described using two sides that interpose the corner and are orthogonal to each other.

As shown in FIG. 5, viewed from the upper surface, when L-shaped ruler D of a right angle abuts with the corner side surface, in the present embodiment, gap T between the peak of compressed portion 21 on the corner side surface and the peak of bent unit 10 on the longitudinal direction side surface part is in a range within 5 mm per vacuum heat insulation material 1m.

Thereby, when a plurality of vacuum heat insulation materials 1 are lined up, even if compressed portions 21 on the corner side surface abut with each other and a gap is generated, it is possible to set a maximum gap between each vacuum heat insulation material 1 to within 10 mm formed by protrusions 11 abutting with each other. At this time, it is possible for thermal conductivity of the gap to be 50 mW/mK or less, and to be suppressed to be substantially equal to or less than thermal conductivity when a gap is filled by glass wool that is a general heat insulation material. In this manner, according to the present embodiment, it is possible to secure the heat insulation property with an equal level without filling the gap by the insulation material of glass wool and the like.

Note that, L-shaped ruler D of a right angle described above is used in which one side is 500 mm or more.

In addition, near the center line B in FIG. 8, it is possible to bend fin 4 further close to the core material by applying adhesive such as hot melt or double-sided tape and gap T is further reduced.

Here, as an example, it is possible to form compressed portion 21 by press molding on protrusion 11 on the corner side surface described above by thermoforming while heating.

Thereby, also in a case where the thickness of vacuum heat insulation material 1 is 20 mm or more, even if multiple fins 4 are overlapped by bending in a complex manner on the corner side surface by performing press molding of protrusion 11 on the corner side surface while heating, since the outer covering material sheets 2a and 2b themselves are softened by applying heat, it is possible to reliably compress protrusion 11 and form compressed portion 21. Then, it is possible to reliably set a protruding dimension of protrusion 11 to substantially the equal height as the longitudinal direction side surface part, that is, within 5 mm from the peak of longitudinal direction side surface by cooling and curing without any changes.

In this manner, according to the present embodiment, it is possible to more reliably secure the heat insulation property of the gap that is generated between each vacuum heat insulation material 1.

In particular, in a case where thickness of the vacuum heat insulation material is 20 mm or more (for example, 25 mm, 30 mm, 35 mm, 40 mm, or the like), press molding of protrusion 11 on the corner side surface is more effectively performed by thermoforming while heating.

The thickness of the vacuum heat insulation material is appropriately modified according to need.

Furthermore, in the present embodiment, thermoforming is performed at a melting temperature or more of thermally fused layer 6 of outer covering material sheets 2a and 2b by which outer covering material 2 is configured. For example, in a case where thermally fused layer 6 is formed by linear low density polyethylene, protrusion 11 is press molded while heating at a temperature of 120° C. or more that is a melting point of linear low density polyethylene.

In this manner, in the corner, a location at which thermally fused layer 6 is melted and adhered (for example, location 5a in FIG. 2) is generated also in a region other than thermally fused seal 5, that is a heat sealed portion by performing thermoforming at a temperature of the melting temperature or more of thermally fused layer 6.

This can be discriminated by close bonding (adhering) of inside surfaces of two adjacent outer covering material sheets 2a and 2b.

As described above, according to the present embodiment, vacuum heat insulation material 1 is folded over in a state in which outer covering material sheets 2a and 2b of a part which configures compressed portion 21 are thermally fused to each other by melting thermally fused layer 6 on the corner side surface which is formed by folding over fin 4 in two or more.

As a result, on the corner side surface of vacuum heat insulation material 1, in protrusion 11 of the part that is folded over in two or more, protruding dimensions which are generated by folding over are reduced and compressed portion 21 is formed by softening of melting thermally fused layer 6 by thermally fusing. In addition, the entire side surface on a side on which fin 4-3 of vacuum heat insulation material 1 is bent has substantially equal height across the entire side surface reaching from the corner in the longitudinal direction. Consequently, even if vacuum heat insulation material 1 is installed with a plurality of sheets lined up, it is possible to prevent a large gap from forming between adjacent vacuum heat insulation materials, and it is possible to suppress reduction of the heat insulation property due to generation of the gap.

In addition, the sealed portion is configured by melting and adhering thermally fused layers 6 of fin 4 of bent parts that are thermoformed to each other and an outside air infiltration prevention effect is exhibited even in the sealed portion. Accordingly, it is possible to reduce outside air infiltration from an end edge of fin 4, and thus it is possible to maintain a high heat insulation property by holding a favorable degree of vacuum across a long period.

Thermoforming may be performed at a melting temperature or lower of thermally fused layer 6. In this case, although time is taken, it is possible to obtain the same effect by performing a thermoforming process at a time at which thermally fused layer 6 is softened.

In addition, when viewing an upper surface, for example, it is possible to perform press molding by pressing a heater that has a shape such as L-shaped ruler D shown in FIG. 5. Thereby, not only protrusion 11 on side surface 1a, even protruding bent unit X which is also formed on side surface 1b due to a bent state of fin 4, can be set to have a substantially equal height as side surface 1b, which is effective.

Figure 10:
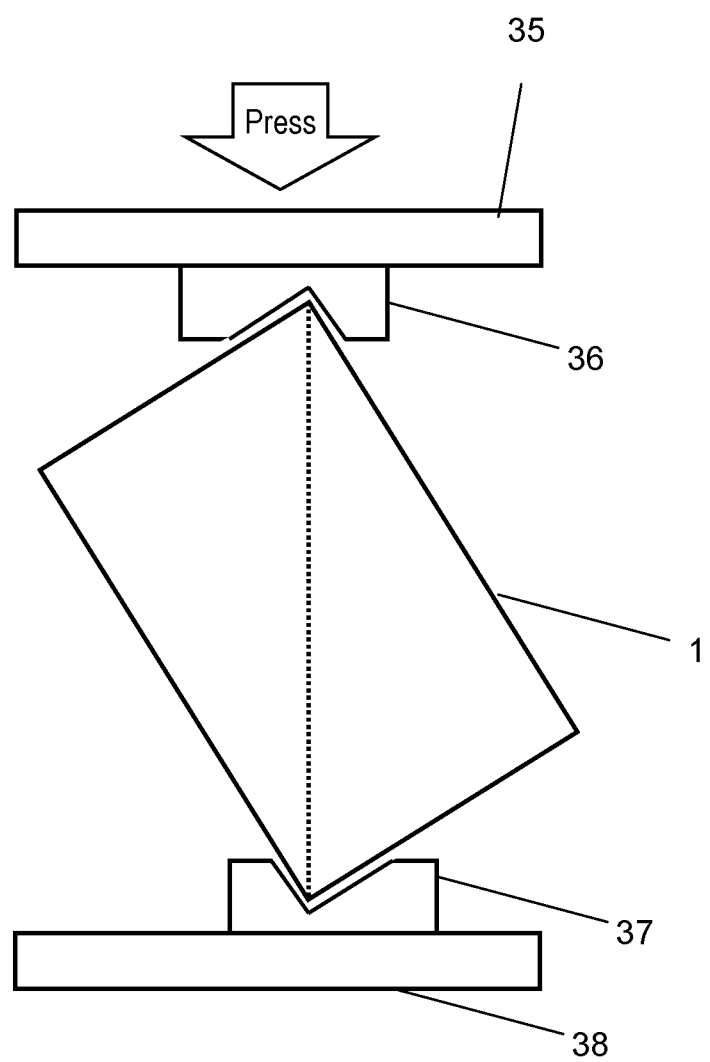
FIG. 10 is a diagram for describing an example of a compression method in the embodiment of the present invention.
Figure 11:
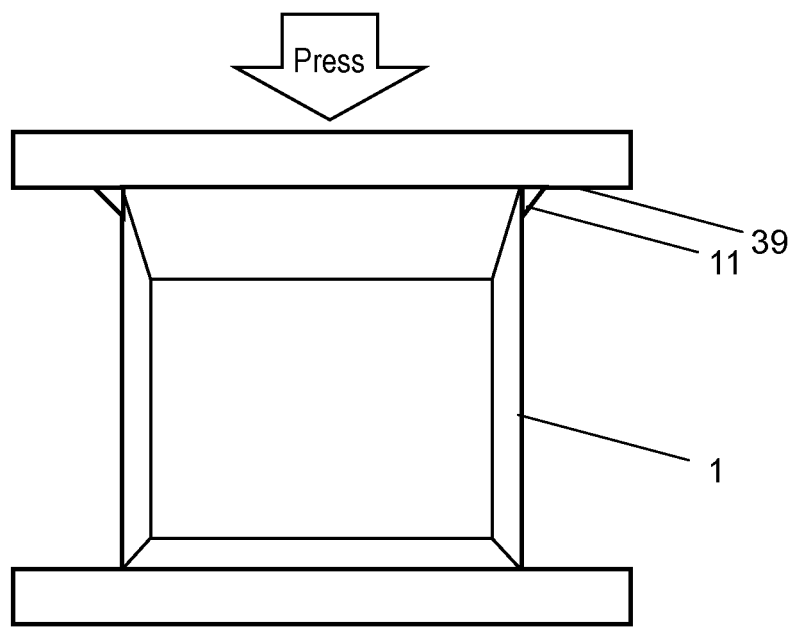
FIG. 11 is a diagram for describing an example of a compression method in the embodiment of the present invention.
Figure 12:
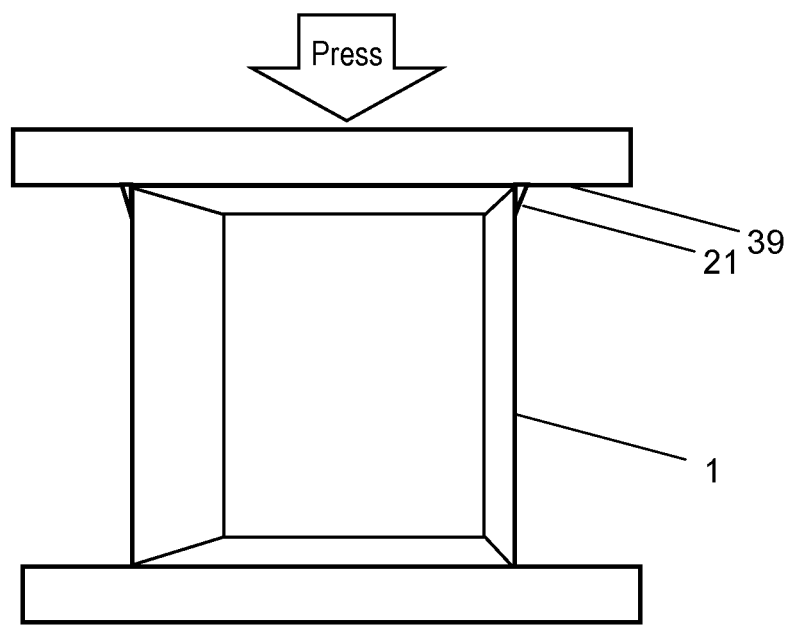
FIG. 12 is a diagram for describing an example of a compression method in the embodiment of the present invention.
Figure 13:
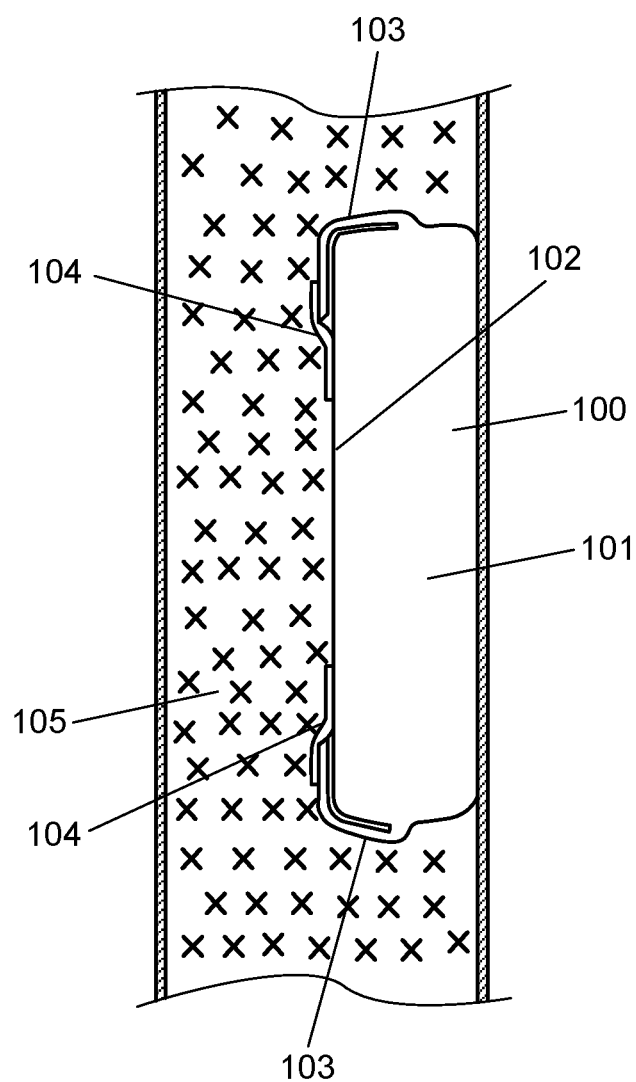
FIG. 13 is a diagram illustrating a sectional structure of a vacuum heat insulation material of the background art described in PTL 1.
Figure 14:
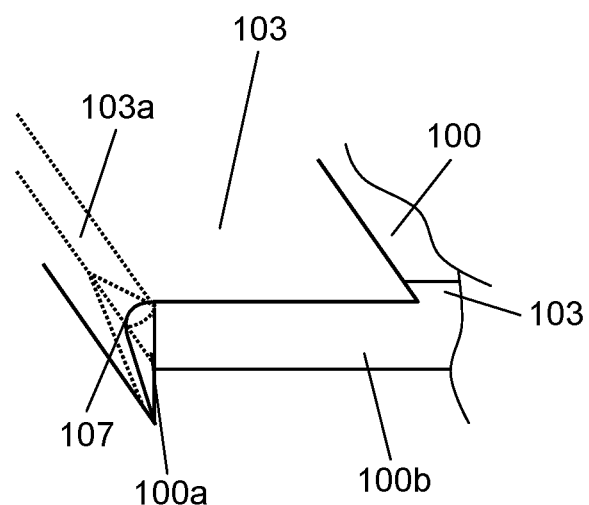
FIG. 14 is a diagram illustrating a configuration of a bent unit in the vacuum heat insulation material in the background art.

FIGS. 10 to 12 are diagrams for describing an example of a compression method in the embodiment of the present invention.

First, it is possible to form compressed portion 21 by compressing two protrusions 11 at once by simultaneously pressing heaters 35 and 38 of which an end surface has a shape of an L-shaped ruler D along jigs 36 and 37 on respective corners (on a diagonal line) facing vacuum heat insulation material 1 (refer to FIG. 10).

In addition, as described above, in the present embodiment, press molding is performed by pressing a heater that has a shape such as L-shaped ruler D, but the present invention is not limited to the example. For example, as shown in FIGS. 11 and 12, press molding may be performed pressing heater 39 that has a shape of a straight line. In this case, first, it is possible to compress protrusion 11 and manufacture compressed portion 21 by pressing heater 39 that has a shape of a straight line against fin 4-2 (FIG. 11), and subsequently, pressing heater 39 that has a shape of a straight line against fin 4-3 (FIG. 12).

In addition, protrusion 11 may be compressed and compressed portion 21 may be formed by first, heating the corner part, thereafter pressing the mold that has a shape as L-shaped ruler or the mold that has a shape of a straight line against side surfaces 1*a* and 1*b*.

In addition, protrusion 11 may be compressed and compressed portion 21 may be formed by warming the corner without being in contact with the corner and pressing a mold using radiant heat of an infrared heater or the like.

In addition, protrusion 11 may be compressed and compressed portion 21 may be formed by warming the corner without being in contact with the corner and pressing a mold while, for example, putting vacuum heat insulation material 1 in a high temperature oven (heating furnace).

Furthermore, press molding may be performed on at least an end surface part of the corner. However, the present invention is not limited to the example, and the entire region of side surface 1*a* in the longitudinal direction in which protrusion 11 is generated may be integrally press molded. Thereby, it is possible to set the entire region of side surface 1*a* of a side of the part on which fin 4 is bent, that is, the height on the entirety of side surface 1*a* reaching from the corner in the longitudinal direction to a more uniform horizontal plane shape, which is favorable.

In addition, in the present embodiment, outer covering material 2 uses a three-sided bag type, and protrusion 11 which is generated on the corner side surface tends to have a high height. In the present embodiment, also in vacuum heat insulation material 1 that uses such outer covering material 2 of the three-sided bag type, it is possible to set the height of compressed portion 21 on the corner side surface as a substantially equal height to the peak of bent unit 10 on the longitudinal direction side surface part.

Moreover, it is possible to realize a configuration in which there is no concern of reduction of the degree of vacuum due to a through-hole in a fused unit which is generated in a case where a bag-shaped pillow type outer covering material is used which is formed by fusing one outer covering material sheet in a cylindrical shape, by using outer covering material 2 of the three-sided bag type (refer to PTL 2). Consequently, it is possible to maintain a high heat insulation property by holding the degree of vacuum of vacuum heat insulation material 1 itself for a longer period. Note that, in the vacuum heat insulation material described in PTL 2, when the outer covering material sheet is processed in a cylindrical shape, since it is possible to match the size (thickness) in the width direction to the core material, the fin tends not to be generated on the side surface, and the protrusion in which the outer covering material sheet is folded into two or more is not formed on the corner as in the three-sided bag type of the present embodiment. In contrast to this, in the present embodiment, since protrusion 11 in which the outer covering material sheet is folded into two or more is generated on the corner, the protrusion 11 is compressed and compressed portion 21 is formed.

Furthermore, in vacuum heat insulation material 1 in the present embodiment, not only compressed portion 21 which is formed from protrusion 11 on the corner side surface, but also a bent piece of fin 4 folded over in the horizontal plane which is orthogonal to the side surface, it is possible to set the height dimension of the bent piece to substantially an equal height to the horizontal plane or within 5 mm with respect to the height of the horizontal plane.

On the horizontal plane of vacuum heat insulation material 1, a protective plate (not shown in the drawings) which protects vacuum heat insulation material 1 may be used by being superimposed. Even in such a case, it is possible to suppress a gap which is generated between the plane and the protective plate and it is possible to suppress reduction of the heat insulation property due to generation of the gap.

Furthermore, as the protective plate described above, it is possible to fill a gap which is generated between the bent piece of fin 4 that is folded over on the horizontal plane and the horizontal plane by using a configuration in which the surface on the side that faces at least vacuum heat insulation material 1 is a soft sponge shape. Accordingly, it is possible to more effectively suppress reduction of the heat insulation property due to generation of the gap.

In addition, since vacuum heat insulation material 1 has substantially equal height across the entirety of the horizontal plane, even if vacuum heat insulation materials 1 are disposed superimposed, it is possible to prevent formation of a large gap between horizontal planes. Consequently, it is possible to also suppress reduction of the heat insulation property due to generation of the gap on the horizontal plane.

Note that, fin 4 that is folded over on the horizontal plane of vacuum heat insulation material 1 may be fixably attached by tape and the like on the horizontal plane, or fixably adhered using an adhesive such as hot melt. Due to this, when transporting load of vacuum heat insulation material 1, fin 4 that is bent is open, and it is possible to effectively prevent change of shape due to contact with a transport container or the like.

Here, a bending direction of fin 4 will be described. In the present embodiment, as shown in FIG. 7, fins 4-1, 4-2, and 4-3 of outer covering material 2 are bent from side surface of vacuum heat insulation material 1 toward one horizontal plane 1*c*. That is, the fins are bent in the same direction (bent on the upper surface in the drawing).

In this case, as shown in (c) of FIG. 7, the protrusion which is generated in bent unit X on the corner of one horizontal plane 1*c* (upper surface) is configured from two outer covering material sheets of fin 4-2 (one fin) and four outer covering material sheets of fin 4-3 (two fins), and the thickness of the protrusion becomes a thickness of a total of six outer covering material sheets (three fins).

However, for example, fin 4-2 may be bent toward one horizontal plane 1*c*, and fin 4-3 may be bent toward another horizontal plane. That is, the fin may be bent in the opposite direction (bent on the lower surface and the upper surface in the drawing).

Thereby, protrusion 11 which is generated on the corner on the horizontal plane has two outer covering material sheets of fin 4-2 (one fin) on one horizontal plane 1*c* and four outer covering material sheets of fin 4-3 (two fins) in the other horizontal plane.

That is, in a case where fins 4-2 and 4-3 are bent at opposite directions from each other, it is possible to further reduce the height of protrusion 11 which is generated on the corner on the horizontal plane, at a time point at which the fin is bent in comparison to a case where fins 4-2 and 4-3 are bent in the same direction. That is, it is possible to further reduce the height of protrusion 11 with respect to one direction at a time point at which the fins are bent by bending two intersecting fins in different directions.

In addition, in the present embodiment, as described in FIG. 7, in a sequence of bending of fins, fin 4-1 on one side of outer covering material 2 is bent from the side surface of vacuum heat insulation material 1 toward the horizontal plane, next, fin 4-2 in a direction which intersects with fin 4-1 is bent, and next, fin 4-3 in a direction which intersects with fin 4-2 is bent.

However, the present invention is not limited to the example, for example, fin 4-2 may be bent, next, fin 4-1 in a direction which intersects with fin 4-2 may be bent, and next, fin 4-3 in a direction which intersects with fin 4-2 may be bent.

In this case, in bending work of the fin, as long as adjacent fin 4-1 and adjacent fin 4-3 are bent centered on fin 4-2, work is easy.

In addition, as shown in FIG. 9, in a part of thermally fused seal 5 of fin 4 which vacuum seals outer covering material 2 of vacuum heat insulation material 1, there may be a configuration such that at least one concavity 9 is formed, the thickness of thermally fused layer 6 is thin in the part of concavity 9, and outside air infiltration to the inside is reduced from a part that is exposed on the outer peripheral end surface of outer covering material 2 of thermally fused layer 6.

By configuring in this manner, it is possible to more strongly reduce outside air infiltration by matching an effect of the sealed portion that is configured by thermoforming fin 4 and melting and adhering thermally fused layers 6 to each other and an effect due to providing concavity 9 on thermally fused seal 5. Consequently, it is possible to hold a favorable degree of vacuum across a long period and maintain a high heat insulation property.

A wave shape of concavities and convexities which are generated by providing concavity 9 on thermally fused seal 5 acts such that the amount of protrusion of protrusion 11 is large due to the concavities and convexities as described above. However, as described above the amount of protrusion of compressed portion 21 is reduced and it is possible to effectively reduce the amount of protrusion of compressed portion 21 while exhibiting the effect of reducing outside air infiltration due to providing concavity 9 by performing compression by thermoforming.

As described above, it is possible to use vacuum heat insulation material 1 in the present embodiment as the heat insulation wall such as a housing heat insulation wall or a container wall by disposing a plurality of vacuum heat insulation materials 1 lined up. In the heat insulation wall which is configured with vacuum heat insulation materials 1 lined up, it is possible to set the thermal conductivity of the gap which is generated between each vacuum heat insulation material to be smaller than thermal conductivity of glass wool that is a general heat insulation material of 50 mW/mK or less. Consequently, it is possible to secure the favorable heat insulation property without filling the gap by the heat insulation material of glass wool and the like.

As a more specific example, it is possible to use a heat insulation wall in a container of a land railway vehicle, a truck, a refrigerated vehicle, and the like which are related to transport. In addition, it is also possible to use the heat insulation wall in a container or the like of a maritime transport ship.

In addition, as described above, it is possible to apply a heat insulation wall to a housing, low-temperature storage, agricultural warehouse, and the like which are related to construction.

That is, it is possible to secure the high heat insulation property by using the vacuum heat insulation material of the present embodiment in a heat insulation wall on which the vacuum heat insulation materials are lined up to cover the surface and a casing that is configured by the heat insulation wall.

Although the vacuum heat insulation material of the present embodiment is described above, the present invention is not limited to the example. That is, it is considered that the embodiment which is currently disclosed is not limited to the all of the points in the exemplifications. That is, the scope of the present invention is not configured by the embodiment exemplified and is indicated by the claims, and the meaning equivalent to the claims and all modifications within the scope of the claims are intended to be included.

For example, a part in which an end of the outer covering material sheet and an end of the outer covering material sheet are superimposed is generated in the middle, not on the side ends in the vacuum heat insulation material. In such a type of vacuum heat insulation material, a superimposed part (protrusion) of the outer covering material sheet end in the middle of the side may be a projection protruding more greatly than the protrusion of the corner side surface.

In this manner, since projection (protrusion) which is generated in the middle of the side due to overlap of the outer covering material sheet end does not have as high rigidity as the protrusion that is generated on the corner side surface, when the vacuum heat insulation materials are disposed lined up, it is possible to squash the projection by setting the side surfaces of each vacuum heat insulation material to a compressed state. Consequently, in order to reduce the gap when the vacuum heat insulation materials are disposed lined up and to suppress reduction of the heat insulation property due to generation of the gap, the compressed portion is formed by compressing at least the protrusion with rigidity on the corner side surface and the amount of protrusion is small. That is, the vacuum heat insulation material configured to have the projection (protrusion) in the middle of the side protruding more greatly than the protrusion of the corner side surface is also included in the scope of the claims of the invention.

Note that, in this manner, even in the vacuum heat insulation material in which the part in which the ends of the outer covering material sheets are superimposed on each other is present in the middle of the side, as described in the embodiment, it is possible to set substantially equal height across the entirety of the side by compressing by pressing a heater that has a shape of a straight line across the entire side, and it is possible to reduce the gap when the vacuum heat insulation materials are disposed lined up to suppress reduction of the heat insulation property due to generation of the gap.

As described above, according to a first aspect of the present embodiment, there is provided a vacuum heat insulation material including an outer covering material which has a gas barrier property and a core material that is provided in an inside of the outer covering material, the inside of the outer covering material being vacuum sealed, in which a sealed portion that is configured by sealing the peripheral edge of the outer covering material, a fin that is formed on the peripheral edge of the outer covering material, and a compressed portion that is formed by a protrusion being compressed, the protrusion being generated when the peripheral edge of the outer covering material is folded back toward the core material are provided.

Thereby, the protrusion on which the peripheral edge of the outer covering material of the vacuum heat insulation material is bent is compressed, and the entire side surface of a bent side has a substantially equal height across the entire side surface reaching from a corner to a longitudinal direction. Consequently, even if the vacuum heat insulation material is installed with a plurality of sheets lined up, it is possible to prevent a large gap from forming between adjacent vacuum heat insulation materials, and it is possible to suppress reduction of the heat insulation property due to generation of the gap.

Here, "compressed" means that the normally performed bending process of the fin is not sufficient, and change of shape is performed by applying pressure larger than that of the normally performed process.

In a case where the protrusion of the corner is smaller than that of a case where only the bending process of the fin is performed, which is general, it is possible to discriminate that compression in the present specification is performed.

For example, in the compression, it is possible to apply pressure by a pressing machine or vise.

Next, according to a second aspect, in the first aspect, the compressed portion is formed in the corner of the vacuum heat insulation material.

According to such a configuration, the protrusion on which the fin is bent that is generated on the corner of the vacuum heat insulation material is compressed, and the entire side surface of the bent side has a substantially equal height across the entire side surface reaching from the corner in the longitudinal direction.

Next, according to a third aspect, in the first aspect or the second aspect, the compressed portion is formed by thermoforming the protrusion that is formed in the fin.

Thereby, since the outer covering material sheet itself is softened by applying heat, the protrusion on which the fin of the vacuum heat insulation material is bent is reliably compressed, and the entire side surface of the side has a substantially equal height across the entire side surface reaching from a corner in the longitudinal direction. Consequently, even if the vacuum heat insulation material is installed with a plurality of sheets lined up, it is possible to prevent a large gap from forming between adjacent vacuum heat insulation materials, and it is possible to suppress reduction of the heat insulation property due to generation of the gap.

Here, "thermoforming" has a meaning of press molding while heating at a melting temperature or more of the thermally fused layer of the outer covering material sheet, and press molding while heating at a melting temperature or less of the thermally fused layer of the outer covering material sheet.

In a case where thermoforming is performed at a melting temperature or more of the thermally fused layer of the outer covering material sheet, on the corner, a location is generated at which the thermally fused layer is melted and adhered also in a region other than the heat sealed portion. This is because the thermoforming described in the present specification is performed. This can be discriminated by close bonding (adhering) of inside surfaces of two adjacent outer covering material sheets.

Thermoforming does not necessarily have a meaning of only press molding while heating, and also includes first performing heating, and then pressing the mold.

Next, according to a fourth aspect, in any one of the first to third aspects, the outer covering material has a thermally fused layer, and the thermally fused layer of the compressed portion is configured to be thermally fused by compressing by which the compressed portion is formed.

Thereby, in the compressed portion which is formed from the protrusion of the part that is bent in two or more of the vacuum heat insulation material, protruding dimensions which are generated by overlapping are reduced by softening due to thermal fusing. Then, the entire side surface on a side on which the fin of the vacuum heat insulation material is bent has substantially equal height across the entire side surface reaching from the corner in the longitudinal direction. Thereby, even if the vacuum heat insulation material is installed with a plurality of sheets lined up, it is possible to prevent a large gap from forming between adjacent vacuum heat insulation materials, and it is possible to suppress reduction of the heat insulation property due to generation of the gap. Moreover, since the sealed portion is configured by a part in which the outer covering materials are thermally fused to each other and the outside air infiltration prevention effect is exhibited in the sealed portion, it is possible to reduce outside air infiltration, and thus it is possible to maintain the high heat insulation property by holding a favorable degree of vacuum across a long period.

Here, the configuration in which the thermally fused layer of the compressed portion is thermally fused has the meaning of there being a location at which the thermally fused layer is melted and adhered other than the heat sealed portion.

This can be discriminated by close bonding (adhering) of inside surfaces of two adjacent outer covering material sheets.

According to a fifth aspect, in any one of the second to fourth aspects, the height of the compressed portion is a height within a range of 5 mm from the peak of the bent unit on the longitudinal direction side surface part other than the corner on which the compressed portion is formed.

Thereby, even if a plurality of sheets of the vacuum insulation materials are disposed to be lined up and a gap is formed due to the compressed portions remaining on the corner side surface, which abut with each other, it is possible to set a maximum gap between each vacuum heat insulation material within 10 mm formed by the compressed portions abutting with each other.

At this time, it is possible for thermal conductivity of the gap to be 50 mW/mK or less, and to be suppressed to substantially equal to or less than thermal conductivity when a gap is filled by glass wool that is a general heat insulation material. Consequently, it is possible to secure the heat insulation property at an equal level without filling the gap by the heat insulation material of glass wool and the like.

According to a sixth aspect, in any one of the second to fifth aspects, the outer covering material is configured by a three-sided bag that is obtained by fusing three sides of the two outer covering material sheets, the core material is vacuum sealed in the three-sided bag, and the fins on the peripheral edges of the three-sided bag are bent and two or more of the fins overlap on the corner.

Thereby, also in the three-sided bag type vacuum heat insulation material in which two or more fins overlap on the corner side surface, it is possible to suppress reduction of the heat insulation property by preventing generation of the gap between the vacuum heat insulation materials. In addition, it is possible to realize a configuration in which there is no concern of reduction of the degree of vacuum due to a through-hole in the fused unit in a manner of the bag-shaped pillow type in which one outer covering material sheet is fused in a cylindrical shape, and it is possible to maintain a high heat insulation property by holding the degree of vacuum of the vacuum heat insulation material itself for a longer period.

According to a seventh aspect, in any one of the second to sixth aspects, the height of the fin that is folded over on the horizontal plane which is orthogonal to the side surface of the corner is configured to be a substantially equal height to the horizontal plane.

Here, when the height of the overlapped fin is a substantially equal height to the horizontal plane, for example, pressure may be applied by a pressing machine or vise.

In addition, the height may be made substantially equal by press molding while heating at the melting temperature or more of the thermally fused layer of the outer covering material sheet, or press molding while heating at the melting temperature or less of the thermally fused layer of the outer covering material sheet.

Note that, molding while heating does not necessarily have a meaning only of press molding while heating, and has the meaning of first heating, and then pressing the mold.

In addition, the height may be substantially equal by warming the corner without being in contact with the corner and pressing a mold using radiant heat of an infrared heater or the like.

Thereby, on the horizontal plane of the vacuum heat insulation material, a protective plate which is provided to protect the vacuum heat insulation material is provided to be overlapped, and at that time, it is possible to suppress the gap which is generated with the protective plate. Consequently, it is possible to suppress reduction of the heat insulation property due to such a gap.

INDUSTRIAL APPLICABILITY

As described above, according to the present invention, it is possible to exhibit an exceptional effect which is able to suppress reduction of the heat insulation property due to a gap between the vacuum heat insulation materials that are generated when a plurality of sheets of vacuum heat insulation materials are disposed to be lined up. Consequently, the present invention is useful in being able to provide the vacuum heat insulation material that is able to secure the high heat insulation property and it is possible to apply to an application in a varied wide range.

REFERENCE MARKS IN THE DRAWINGS 1 vacuum heat insulation material
1a, 1b side surface
1c horizontal plane
2 outer covering material
2a, 2b outer covering material sheet
3 core material
4, 4-1, 4-2, 4-3 fin
5 thermally fused seal
5a location
6 thermally fused layer
7 gas barrier layer
8 front surface protective layer
9 concavity
10 bent unit
11 protrusion
21 compressed portion
35, 38, 39 heater
36, 37 jig
40 ridge
B center line
C part
D L-shaped ruler
T gap
X bent unit

The invention claimed is:

1. A vacuum heat insulation material comprising:
an outer covering material that has a gas barrier property;
a core material that is provided in an inside of the outer covering material, the inside of the outer covering material being vacuum sealed;
a sealed portion that is configured by sealing a peripheral edge of the outer covering material;
a first fin and a second fin, which are formed on the peripheral edge of the outer covering material; and
a compressed portion that is formed by a protrusion being compressed, the protrusion being generated on a side surface of the core material when the first fin and the second fin are folded back toward a horizontal plane of the core material, which is a surface orthogonal to the side surface of the core material, wherein:
the compressed portion is formed on an end of the side surface of a corner of the vacuum heat insulation material, and
a height of the compressed portion is equal to or smaller than 5 mm measured from a peak of a ridge other than the corner on which the compressed portion is formed.

2. The vacuum heat insulation material of claim 1, wherein the compressed portion is formed by thermoforming the protrusion that is formed in the fin.

3. The vacuum heat insulation material of claim 2, wherein:
the outer covering material has a thermally fused layer, and
the thermally fused layer of the compressed portion is thermally fused by compressing by which the compressed portion is formed.

4. The vacuum heat insulation material of claim 2, wherein:
the outer covering material is configured by a three-sided bag that is obtained by fusing three sides of two outer covering material sheets,
the core material is vacuum sealed in the three-sided bag, and
the first fin and the second fin on the peripheral edges of the three-sided bag are bent and overlap on the corner.

5. The vacuum heat insulation material of claim 2, wherein a height of the first fin and the second fin that are folded over on the horizontal plane is substantially equal to a height to the horizontal plane.

6. The vacuum heat insulation material of claim 1, wherein:
the outer covering material has a thermally fused layer, and
the thermally fused layer of the compressed portion is thermally fused by compressing by which the compressed portion is formed.

7. The vacuum heat insulation material of claim 6, wherein:
the outer covering material is configured by a three-sided bag that is obtained by fusing three sides of two outer covering material sheets,
the core material is vacuum sealed in the three-sided bag, and
the first fin and the second fin on the peripheral edges of the three-sided bag are bent and overlap on the corner.

8. The vacuum heat insulation material of claim 6, wherein a height of the first fin and the second fin that are folded over on the horizontal plane is substantially equal to a height to the horizontal plane.

9. The vacuum heat insulation material of claim 1, wherein:

the outer covering material is configured by a three-sided bag that is obtained by fusing three sides of two outer covering material sheets, the core material is vacuum sealed in the three-sided bag, and the first fin and the second fin on the peripheral edges of the three-sided bag are bent and overlap on the corner.

10. The vacuum heat insulation material of claim 9, wherein a height of the first fin and the second fin that are folded over on the horizontal plane is substantially equal to a height to the horizontal plane.

11. The vacuum heat insulation material of claim 1, wherein a height of the first fin and the second fin that are folded over on the horizontal plane is substantially equal to a height to the horizontal plane.

12. The vacuum heat insulation material of claim 1, wherein a thickness of the vacuum heat insulation material is 20 mm or more.

* * * * *